United States Patent
Ben Kaab et al.

(10) Patent No.: US 11,229,204 B2
(45) Date of Patent: Jan. 25, 2022

(54) HERBICIDAL COMPOSITION COMPRISING AT LEAST ONE PHENOLIC ACTIVE COMPOUND

(71) Applicants: UNIVERSITÉ DE LIÈGE, Liège (BE); FACULTÉ DES SCIENCES MATHÉMATIQUES, PHYSIQUES ET NATURELLES DE TUNIS, Tunis (TN); Centre de Biotechnologie de Borj Cedria CBBC, Hammam-lif (TN)

(72) Inventors: Sofiene Ben Kaab, Gembloux (BE); Haissam Jijakli, Scy (BE); Riadh Ksouri, Hammam-lif (TN); Olivier Parisi, Gembloux (BE); Simon Dal Maso, Mont-sur-Marchienne (BE)

(73) Assignee: Université de Liège, Liège (BE)

( * ) Notice: Subject to any disclaimer, the term of this patent is extended or adjusted under 35 U.S.C. 154(b) by 0 days.

(21) Appl. No.: 16/971,746

(22) PCT Filed: Feb. 21, 2019

(86) PCT No.: PCT/EP2019/054330
§ 371 (c)(1),
(2) Date: Aug. 21, 2020

(87) PCT Pub. No.: WO2019/162388
PCT Pub. Date: Aug. 29, 2019

(65) Prior Publication Data
US 2020/0390097 A1 Dec. 17, 2020

Related U.S. Application Data (63) Continuation of application No. PCT/EP2018/054418, filed on Feb. 22, 2018.

(51) Int. Cl.
*A01N 43/42* (2006.01)
*A01N 37/10* (2006.01)

(52) U.S. Cl.
CPC .............. *A01N 43/42* (2013.01); *A01N 37/10* (2013.01)

(58) Field of Classification Search
CPC ................................ A61N 43/42; A01N 43/42
See application file for complete search history.

(56) References Cited

U.S. PATENT DOCUMENTS

2007/0232495 A1* 10/2007 Nappa .................... A01N 37/40
504/194

FOREIGN PATENT DOCUMENTS

WO 2013184884 12/2013

OTHER PUBLICATIONS

Stainer et al. (Crop Protection 25 (2006) 1238-1243). (Year: 2006).*
Cheryl A. Hobbs et al., "Genotoxicity evaluation of the flavonoid, myricitrin, and its aglycone, myricetin", Food and Chemical Toxicology, (20150900), vol. 83, 10 pages.

(Continued)

*Primary Examiner* — Benjamin J Packard
(74) *Attorney, Agent, or Firm* — Hanley, Flight & Zimmerman, LLC (57) ABSTRACT

The present invention relates to a herbicidal composition comprising at least one phenolic active compound being myricitrin. The invention also relates to the use of such a herbicidal composition.

20 Claims, 3 Drawing Sheets

(56) References Cited

OTHER PUBLICATIONS

Francisco A Macías et al, "Allelopathy—a natural alternative for weed control", Pest Management Science, Bognor Regis; GB, (Jan. 1, 2007), vol. 63, No. 4, 22 pages.

Maristela Imatomi et al, "Phytotoxic effect of bioactive compounds isolated from Myrcia tomentosa (Myrtaceae) leaves", Biochemical Systematics and Ecology., GB, (Feb. 1, 2013), vol. 46, 8 pages.

Ricardo Salazar-Aranda et al, "Activity of Polyphenolic Compounds against Candida glabrata", Molecules, (Sep. 29, 2015), vol. 20, No. 10, 10 pages.

Zelia Velez et al, "Biological Characterization of *Cynara cardunculus* L. Methanolic Extracts: Antioxidant, Anti-proliferative. Anti-migratory and Anti-angiogenic Activities", Agriculture, (Dec. 19, 2012), vol. 2, No. 4, 22 pages.

Sofiane Dairi et al, "Antioxidant effects of extra virgin olive oil enriched by myrtle phenolic extracts on iron-mediated lipid peroxidation under intestinal conditions model", Food Chemistry, NL, (Apr. 21, 2017), vol. 237, 8 pages.

Laura De Martino et al, "In Vitro Phytotoxicity and Antioxidant Activity of Selected Flavonoids", International Journal of Molecular Sciences, CH, (May 4, 2012), vol. 13, No. 5, doi: 10.3390/ijms13055406, ISSN 1661-6596, 14 pages.

International Searching Authority, "Search Report," issued in connection with PCT patent application No. PCT/EP2019/054330, dated Apr. 29, 2019, 5 pages.

International Searching Authority, "Written Opinion," issued in connection with PCT patent application No. PCT/EP2019/054330, dated Apr. 29, 2019, 7 pages.

International Searching Authority, "Search Report," issued in connection with PCT patent application No. PCT/EP2018/054418, dated Jul. 11, 2019, 5 pages.

International Searching Authority, "Written Opinion," issued in connection with PCT patent application No. PCT/EP2018/054418, dated Jul. 11, 2019, 7 pages.

Maristela Imatomi et al., "Phytotoxic effect of bioactive compounds isolated from Myrcia tomentosa (Myrtaceae) leaves", Biochemical Systematics and Ecology 46 (2013) 29-35, 8 pages.

Sunil Kumar et al., "Effect of Seed Treatment of Fungicides and Biocides against Spot Blotch of Wheat Caused by Bipolaris sorokiniana," Int.J.Curr.Microbiol.App.Sci (2019)8(1): 1223-1229, 7 pages.

Kotan et al., "Antibacterial activity of the essential oil and extracts of Satureja hortensis against plant pathogenic bacteria and their potential use as seed disinfectants," (Scientia Horticulturae 153 (2013) 34-41), 8 pages.

Kotan et al., "Antibacterial effects of Origanum onites against phytopathogenic bacteria: Possible use of the extracts from protection of disease caused by some phytopathogenic bacteria," Scientia Horticulturae 172 (2014) 210-220, 11 pages.

Yoon Sun Huh, "Effect of biocide addition on plantlet growth and contamination occurrence during the in vitro culture of blueberry," (2015) Journal of Plant Biotechnology 42(2): 111-116. 6 pages.

\* cited by examiner

HERBICIDAL COMPOSITION COMPRISING AT LEAST ONE PHENOLIC ACTIVE COMPOUND

RELATED APPLICATIONS

This patent arises from the U.S. national stage of International Patent Application Serial No. PCT/EP2019/054330, having an international filing date of Feb. 21, 2019, and claims benefit of International Patent Application Serial No. PCT/EP2018/054418, filed on Feb. 22, 2018, both of which are hereby incorporated by reference in their entireties for all purposes.

FIELD OF THE INVENTION

The invention relates to a herbicidal composition comprising at least one phenolic active compound. The invention also relates to the use of such a herbicidal composition.

DESCRIPTION OF PRIOR ART

Weeds have been documented as serious plant pests which can reduce crop yields and interfere with plant functions to stop their growth. They constantly compete with crops for water and nutrient resources reducing yields and quality and, consequently, causing huge economic losses which can reach 34% in major crops.

Currently, most reliable weed control methods include mechanical weeding, hand weeding and application of chemical herbicides. These last chemical methods pose several problems with their negative impacts on environmental, animal and human health. Also, the systematic application of chemical herbicides increases the weed's resistance to the applied chemical molecules/substances.

The current trend is to find a biological product to minimize the perceived impacts from synthetic herbicides in agriculture production. In this sense, allelopathy can be importantly used to identify new natural compounds and to discover new herbicide target sites. This is the reason why allelopathy can be added to the current repertoire of commercial herbicide mode of action. More particularly, allelopathy is a biochemical interaction of inhibition and promotion within plants or microorganisms through the release of allelochemicals into the environment via root exudation, volatile emissions, leaching from leaves, other aerial parts, and decomposition of plant material. It plays a major role in agro-ecosystems, such as weed control, crop protection, due to its adverse effects on germination and seedling growth. Allelochemicals, especially those that cause damage to receptor plants, have drawn increasing attention in the development of promising alternatives to conventional herbicides in crop protection. Allelochemicals were derived from crop plants which are generally secondary metabolites as phenolic compounds, terpenoids, alkaloids, coumarins, tannins, flavonoids, steroids and quinones.

Phenolic compounds are one of the most categories of the secondary metabolites implicated in plant allelopathy. They represent one of the largest groups, more investigated in relation to their ecological role in plant-soil system and in plant-plant interactions. They are synthesized via the phenylpropanoid pathway and play a role in plant defense mechanisms against biotic and abiotic stresses. They could be an important part of the plants defense system against pests and diseases including root parasitic nematodes. These molecules are widely distributed in leaves, stems, seeds and fruits of many edible plants. Phenolic compounds also constitute one of the most numerous and widely distributed groups of antioxidant substances in the plant kingdom with more than 8000 phenolic structures currently known. It was proved that phenolic compounds play an important role to neutralize free radicals, and quenched singlet oxygen, or decomposing peroxides, which are inevitably produced when aerobic or photosynthetic metabolism is impaired by environmental stresses. It was also proved that these compounds are mainly produced by plants for protection against, insects, viruses and bacteria.

Some herbicidal compositions comprising phenolic compounds were notably tested in a study performed by De Martino et al. (In Vitro Phytotoxicity and Antioxidant Activity of Selected Flavonoids, Int. J. Mol. Sci., 2012, 13, 5406-5419). In this study, 27 flavonoids were tested for their potential herbicidal properties on radical elongation and germination of weeds (*Raphanus sativus* and *Lepidium sativum*). The obtained results indicate that only four flavonoids act on germination and on radical elongation: 3',4'-di-OCH$_3$-flavone, 3-OCH$_3$-flavone, 3,5,7,3',4'-penta-OH-flavone (quercetin) and 5,7-di-OH-flavanone (pinocembrin), with only poor results on radical elongation for the highest tested concentration of $10^{-4}$M.

Thus, nowadays, only few phenolic compounds are identified for their real herbicidal properties and the compositions comprising such compounds are moderately effective both on radical elongation and germination of weeds.

SUMMARY OF THE INVENTION

It is an object of the invention to provide a herbicidal composition comprising at least one phenolic active compound so as to be effective both on radical elongation and germination (pre-emergence herbicidal activity) of weeds but also on germinated and developed weeds (post-emergence herbicidal activity).

More particularly, it is an object of the invention to provide a herbicidal composition comprising at least one newly identified phenolic active compound as an efficient alternative to conventional herbicides in crop protection but also as an alternative to the currently known phenolic compounds used as herbicides, said one newly identified phenolic active compound presenting both a pre-emergence herbicidal activity and a post-emergence herbicidal activity.

To this end, according to the invention, there is provided a herbicidal composition comprising at least one phenolic active compound, said at least one phenolic active compound being myricitrin.

Myricitrin is a phenolic compound presenting the following chemical structure:

Compositions comprising myricitrin are known from the following documents: WO2013/184884, Maristela Imatomi et al. (Phytotoxic effect of bioactive compounds isolated from *Myrcia tomentosa* (Myrtaceae) leaves, Biochemical Systematics and Ecology, vol. 46, 1, February 2013, pages 29-35), Sofiane Dairi et al. (Antioxidant effects of extra virgin olive oil enriched by myrtle phenolic extracts on iron-mediated lipid peroxidation under intestinal conditions model, Food Chemistry, vol. 237, April 2017, pages 297-304), Cheryl A. Hobbs et al. (Genotoxicity evaluation of the flavonoid, myricitrin, and its aglycone, myricetin, Food and Chemical Toxicology, vol. 83, September 2015, pages 283-292), Zelia Velez et al. (Biological characterization of *Cynara cardunculus* L. methanolic extracts: antioxidant, anti-proliferative, anti-migratory and anti-angiogenic activities, Agriculture, vol. 2, no. 4, December 2012, pages 472-492) and Ricardo Salazar-Aranda et al. (Activity of polyphenolic compounds against *Candida glabatra*, Molecules, vol. 20, no. 10, September 2015, pages 17903-17912).

The terms "active compound" mean that the compound is biologically active, more particularly that the compound is active as a herbicide (herbicidal activity). The desired herbicidal activity may be the sort to inhibit seed germination, to prevent the resumption of underground or aerial meristem and bud development, or to inhibit the development and growth of the roots and also of the hypocotyls, the epicotyls and any aerial parts of the plants.

The invention is defined by the independent claims. The dependent claims define advantageous embodiments.

In the context of the present invention, it was surprisingly determined that a composition according to the invention comprising myricitrin as a phenolic active compound demonstrates an efficient herbicidal activity on weeds. Indeed, it was shown that a composition according to the invention comprising myricitrin as a phenolic active compound exhibits both a pre-emergence herbicidal activity and a post-emergence herbicidal activity.

Preferably, in a herbicidal composition according to the invention, myricitrin is from synthetic origin.

Alternatively, in a herbicidal composition according to the invention, myricitrin is from an extract or from a fraction of an extract from the roots, the leaves, the stems, the fruits, the seeds and/or the flowers of at least one plant chosen from the group consisting of *Limoniastrum guyonianum, Peganum harmala, Ruta chalepensis, Ricinus communis, Nitraria retusa, Cynara cardunculus, Artemisia herba-alba, Mesembryanthemum edule, Tamarix gallica, Datura stramonium, Myrica esculenta, Myrica cerifera, Nymphaea lotus, Nymphaea odorata, Chrysobalanus icaco, Polygonum aviculare* and mixtures thereof. It is understood that any other plant from which an extract comprising myricitin and/or a fraction of an extract comprising myricitin can be obtained is part of the present invention. The previous list of plants is not exhaustive.

The extract used in the context of the invention can be a cellular extract or an extracellular extract of the plant, which can be prepared according to any method known to those skilled in the art for extracting compounds from plant tissues. The extract can be obtained from the roots, the leaves, the stems, the fruits, the seeds and/or the flowers.

Advantageously, the extract is derived from the leaves, the fruits or the seeds, the use of which does not lead to the death of the plant from which they are extracted.

By way of examples of extraction methods, mention may be made of the conventional methods of hot solvent extraction or cold solvent extraction, maceration, lixiviation, cryoextraction, digestion, decoction, extractions with supercritical $CO_2$ or extractions using undulator radiation, such as microwaves or ultrasound. These methods can be combined with a subsequent purifying, filtering, concentrating and/or drying step.

Advantageously, the extract used is obtained by extraction with a solvent selected from water, alcohols, alkanes, ketones, esters, ethers, polyols, chlorinated solvents and mixtures thereof. In particular, extraction may be carried out using a solvent, such as an alcoholic solvent selected from ethanol or methanol or else polyethylene glycol or chloroform.

The extract obtained can then be concentrated, or dried, for example by evaporation or lyophilization. The extract obtained can be incorporated as it is into the composition or else be purified, treated or fractionated, so as to enrich for desired active ingredient.

Fractionation can be for example performed by centrifugal partition chromatography or by reverse phase.

Advantageously, in a herbicidal composition according to the invention, myricitrin is present at a concentration ranging from 0.1 mg/L to 10000 mg/L, preferably ranging from 0.25 mg/L to 5000 mg/L, more preferably ranging from 0.5 mg/L to 2500 mg/L, even more preferably ranging from 0.75 mg/L to 1500 mg/L, even more preferably ranging from 0.8 mg/L to 500 mg/L, even more preferably ranging from 1 mg/L to 100 mg/L.

Preferably, a herbicidal composition according to the invention further comprises at least one additional active compound chosen from the group consisting of syringic acid, p-coumaric acid, quercetin, naringenin, catechin, apigenin, gallic acid, cynarin acid, chlorogenic acid, cynaroside, luteolin, aguerin B, grosheimin, cynaropicrin and mixtures thereof. It is understood that any other appropriate additional active compound is part of the present invention. The previous list of plants is not exhaustive.

Advantageously, in a herbicidal composition according to the invention, said at least one additional active compound is from synthetic origin.

More advantageously, in a herbicidal composition according to the invention, said at least one additional active compound is from an extract or from a fraction of an extract from the roots, the leaves, the stems, the fruits, the seeds and/or the flowers of at least one plant chosen from the group consisting of *Limoniastrum guyonianum, Peganum harmala, Ruta chalepensis, Ricinus communis, Nitraria retusa, Cynara cardunculus, Artemisia herba-alba, Mesembryanthemum edule, Tamarix gallica, Datura stramonium, Myrica esculenta, Myrica cerifera, Nymphaea lotus, Nymphaea odorata, Chrysobalanus icaco, Polygonum aviculare* and mixtures thereof. It is understood that any other plant from which said at least one additional active compound can be obtained is part of the present invention. The previous list of plants is not exhaustive.

Preferably, in a herbicidal composition according to the invention, said at least one additional active compound is present at a concentration ranging from 0.1 mg/L to 10000 mg/L, preferably ranging from 0.2 mg/L to 5000 mg/L, more preferably ranging from 0.25 mg/L to 500 mg/L.

Preferably, a herbicidal composition according to the invention further comprises at least one solvent chosen from the group consisting of at least one natural lipophilic solvent, at least one synthetic lipophilic solvent, at least one natural hydrophilic solvent, at least one synthetic hydrophilic solvent, at least one natural amphiphilic solvent, at least one synthetic amphiphilic solvent and mixtures thereof.

Preferably, in a herbicidal composition according to the invention, said at least one lipophilic solvent is chosen from the group consisting of animal oil, vegetable oil, petrochemical oil and mixtures thereof.

For example, according to the invention, said vegetable oil is chosen from the group consisting of hazelnut oil, rapeseed oil, pine oil, soybean oil, sunflower oil, pistachio oil, olive oil, almond oil, sweet almond oil, peanut oil and mixtures thereof.

Preferably, in a herbicidal composition according to the invention, said at least one hydrophilic solvent is chosen from the group consisting of water, alcohols, ketones, esters, ethers, polyols, ethyl acetate, propylene carbonate, acetonitrile and mixtures thereof.

Advantageously, in a herbicidal composition according to the invention, said at least one natural amphiphilic solvent and/or said at least one synthetic amphiphilic solvent is at least one non-ionic surfactant. This means that, according to the present invention, a non-ionic surfactant can play the role of a solvent. For example, Tween 20® can be considered as a synthetic amphiphilic solvent.

Non-ionic surfactants are amphiphilic substances and have covalently bonded oxygen-containing hydrophilic groups, which are bonded to hydrophobic parent: non-ionic surfactants consist of a hydrophilic head group and a hydrophobic tail.

Preferably, according to the present invention, said at least one non-ionic surfactant is chosen from the group consisting of sorbitan monododecanoate poly(oxy-1,2-ethanediyl), alkyl polyglucosides, sorbitan laurate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene glycol sorbitan laurate, hexaethylene glycol sorbitan monooleate, polyoxyethylene sorbitan stearate, decaglyceryl monooleate, decaglyceryl dioleate, polyoxyethylene sorbitan tristearate, monodehydrosorbitol monooleate, sorbitan monolaurate, sorbitan monopalmitate, sorbitan laurate and mixtures thereof. It is understood that any other appropriate surfactant is part of the present invention. The previous list of plants is not exhaustive.

Commercial names of adequate non-ionic surfactants are for example: Tween 20®, Tween 80®, Span 80®, Atplus® UEP-100, ethoxylated castor oil, Span 85®, Brij® 93, Brij® S 100, IGEPAL® CA-210, IGEPAL® CO-890, MERPOL® HCS, SP Brij® C2 MBAL-SO-(SG), Triton™ x-405 reduced, Etocas® 5, glycerol monostearate, glyceryl stearate, Emulson® CO 9, Span 20® et Span 80® and mixtures thereof.

Advantageously, according to the present invention, said at least one non-ionic surfactant presents a hydrophilic-lipophilic balance (HLB) value comprised between 5 and 7, preferably a HLB value equal to 6.

Such a HLB value of said at least one non-ionic surfactant comprised between 5 and 7 and more preferably equal to 6 was determined, in the context of the present invention, to be the adequate HLB value in order to obtain a composition under the form of an emulsion with the right droplet size allowing the composition to effectively penetrate the plant membranes. Preferably, according to the present invention, the composition under the form of an emulsion presents droplets having a droplet size comprised between 0.05 µm and 10 µm, preferably a droplet size comprised between 0.1 µm and 2 µm, more preferably a droplet size comprised between 0.2 µm and 1 µm.

It was also shown that the compositions according to the invention presenting such a HLB value were more effective in term of pre-emergence and post-emergence herbicidal activity. Also, it was determined that such a HLB value allows to obtain stable composition without the formations of precipitates or supernatants.

Within the meaning of the present invention, the term "HLB" is understood as being an empirical expression which expresses the hydrophilic and hydrophobic (or lipophilic) relationship of a surfactant. The hydrophilic-hydrophobic balance (HLB) of a surfactant expresses its properties: a surfactant has a greater affinity for water if the HLB balance is high (hydrophilic nature) and, conversely, a surfactant has a lower affinity for water (lipophilic or hydrophobic nature) when its HLB value is low.

The determination of the HLB value of a non-ionic surfactant by calculation allows an arbitrary scale for non-ionic polyethoxylated surfactants to be defined. The calculation method can be as follows: HLB=20×Mh/M. This empirical formula allowing the HLB value of a non-ionic surfactant to be calculated comprises the ratio between the molecular mass of the hydrophilic group of the non-ionic surfactant in question (Mh) multiplied by 20 (molar mass of the ethoxylated group $[(-CH_2-CH_2-O-)_n]$ of the non-ionic surfactant) and the molecular mass of the surfactant in question (M).

Starting from this empirical formula, an arbitrary scale is therefore defined and has HLB values comprised between 0 and 20. An HLB value of zero corresponds to a completely lipophilic surfactant, and an HLB value of 20 corresponds to a completely hydrophilic surfactant. Non-ionic surfactants are therefore classified according to this empirically established scale. A distinction is made, therefore, between non-ionic surfactants of low, medium and high HLB: a surfactant of low HLB has an HLB value of from 0 to 6; a surfactant of medium HLB has an HLB value of from 6 to 14 and a surfactant of high HLB has an HLB value of from 14 to 20.

Finally, the HLB value of a non-ionic surfactant allows the solubility of the surfactant in water or in oil to be indicated and therefore the direction of the emulsion (water-in-oil or oil-in-water) to be determined. For this reason, a non-ionic surfactant of high HLB will have a greater affinity for water and will therefore be more soluble in water than in oil and vice versa for surfactants of low HLB, which will be more soluble in oil. A surfactant that is more soluble in water than in oil will influence the direction of the "oil-in-water" emulsion and vice versa for a surfactant that is more soluble in oil than in water.

In the sense of the present invention, said at least one non-ionic surfactant can be a mixture of non-ionic surfactants. For example, such a mixture of non-ionic surfactants can be a mixture of a low HLB non-ionic surfactant with a high HLB non-ionic surfactant. As an example, a mixture of non-ionic surfactants can be a mixture of a first surfactant having a HLB value comprised between 3 and 6 so allowing to disperse an aqueous phase in a lipophilic phase with a second surfactant having a HLB value comprised between 15 and 18 so allowing to disperse a lipophilic phase in an aqueous phase.

In the case of a binary mixture of non-ionic surfactants, the HLB value of this mixture can be calculated as followed:

binary mixture HBL=$[m1/(m1+m2).HLB1]+[m2/(m1+m2).HLB2]$ where m1=mass of the first surfactant
m2=mass of the second surfactant
HLB1=HLB of the first surfactant
HLB2=HLB of the second surfactant According to the invention, like for compositions only comprising one surfactant having a HLB value comprised between 5 and 7, the binary mixture HLB value is preferably comprised between 5 and 7, more preferably equal to 6.

Preferably, in an herbicidal composition according to the invention, said at least one non-ionic surfactant is present in the composition at a concentration ranging from 0.1 g/L to 500 g/L, preferably ranging from 0.25 g/L to 250 g/L, more preferably ranging from 0.5 g/L to 100 g/L, even more preferably ranging from 1 g/L to 50 g/L, even more preferably ranging from 2 g/L to 25 g/L.

Advantageously, a herbicidal composition according to the invention further comprises at least one adjuvant chosen from the group consisting of paraffin wax, Heliosol®, 1-octyl-2-pyrrolidone, Actirob® B, Atplus® 463, Actilandes™, Vegelux®, Emulsol® and mixtures thereof.

Preferably, a herbicidal composition according to the invention is under the form of granules, liquids, emulsions or concentrates. Any type of known herbicidal composition may be prepared.

The present invention is also about the use of a composition according to the invention for obtaining phytotoxic activity comprising inhibiting seed germination, preventing the resumption of underground or aerial meristem and bud development, and/or inhibiting the development and growth of the roots, the development and growth of the hypocotyls, the development and growth of the epicotyls, the development and growth of the plantlets and/or the development and growth of aerial parts of the plant. In particular, use may be made of herbicidal compositions in the form of granules, liquids, emulsions or emulsifiable concentrates, as adjuvants for herbicidal mixture.

In the context of the present invention, the term "inhibiting" means the ability of a composition to stop or slow down a biological process. For example, inhibiting seed germination means slowing down or totally suppressing the germination process and inhibiting the development and growth of the roots, the development and growth of the hypocotyls, the development and growth of the epicotyls, the development and growth of the plantlets or the development and growth of aerial parts of the plant means slowing down or totally suppressing these biological processes.

SHORT DESCRIPTION OF THE DRAWINGS

These and further aspects of the invention will be explained in greater detail by way of examples and with reference to the accompanying figures in which.

On the Figures, when bars share the same letter (A, B, C or D), it statistically means that the treatments are not significantly different.

DETAILED DESCRIPTION OF EMBODIMENTS OF THE INVENTION

Plant Material, Extraction and Fractionation Procedure

Fresh aerial parts of *Cynara cardunculus* (collected from Enfidha region in vegetative stage on February 2015 in Tunisia) were shade dried for 15 days at 30° C.

*Cynara cardunculus* extract was obtained by magnetic stirring of 10 g dry powder of the previously dried aerial parts with 100 ml pure methanol (Emplura EMD Millipore Corporation—Merck KGaA) for 30 min. Methanol was eliminated along rotavapor in vacuum at 45° C. and redissolved in Tween 20® 1%. Extract was kept for 24 h at 4° C., filtered through a Whatman No 4 filter paper, and stored at 4° C. until analyses. The extraction yield was 9.71%. The methanolic filtrate was combined, concentrated under vacuum and eventually fractionated on reverse phase silica gel (Sigma-Aldrich filiale de Merck KGaA).

For the eventual fractionation of the extract, methanolic extract was loaded onto a column containing 10 g of C18 resin per g of dry extract followed by 80 ml of water to remove sugars and other polar compounds. Phenolic molecules adsorbed onto the resin were eluted with mixture methanol/water (1:4; 2:3; 3:2, 4:1; 5:0 v/v) as mobile phase. This fractionation system was based on 2 phases: a solid stationary phase which is C18 phase silica with 40-63 µm and a mobile one which is the eluent at different concentration of methanol. Firstly, the extract was inserted into the upper part of the silica gel using a vacuum pump. Based on the volume of the column and the amount of silica and of the extract added, 300 ml of water were used to remove the sugars in the extract. Afterwards, 200 ml of methanol/water with an increasing gradient (20%, 40%, 60%, 80% and 100%) were added in the column to elute the polar compounds not retained by the silica gel and at the same time soluble in the eluent. Since the silica is hydrophobic, the non-polar compounds are retained on the silica but the polar compounds can cross the silica in order to recuperate them. Several fractions were collected, depending on the gradient methanol/water considered. For the present invention, the fraction obtained with the 40% gradient methanol/water is called "Fraction A" while the fraction obtained with the 60% gradient methanol/water is called "Fraction B". These two fractions (Fraction A and Fraction B) were purified, evaporated, filtered through a Whatman No 4 filter paper, and stored at 4° C. until analyses.

HPLC Analysis—Identification of Phenolic Compounds

Identification of phenolic compounds was performed on *Cynara cardunculus* plant extracts and on fractions obtained from said extracts.

The identification of phenolic compounds was done using HPLC system (consisting of a vacuum degasser, an autosampler, and a binary pump with a maximum pressure of 400 bar; Agilent 1260, Agilent technologies, Germany) equipped with a reversed phase C18 analytical column of 4.6×100 mm and 3.5 µm particle size (Zorbax Eclipse XDB C18). The DAD detector was set to a scanning range of 200-400 nm. Column temperature was maintained at 25° C. The injected sample volume was 2 µl and the flow-rate of mobile phase was 0.4 mL/min. Mobile phase B was milli-Q water consisted of 0.1% formic acid and mobile phase A was Methanol. The optimized gradient elution was illustrated as follows: 0-5 min, 10-20% A; 5-10 min, 20-30% A; 10-15 min, 30-50% A; 15-20 min, 50-70% A; 20-25 min, 70-90% A; 25-30 min, 90-50% A; 30-35 min, return to initial conditions.

Myricitrin, quercetin, p-coumaric acid, naringenin and syringic acid were used as standards. Identification analysis was done by comparison of their retention time with those obtained from the extracts. For the quantitative analysis, a calibration curve was obtained by plotting the peak area against different concentrations for each identified compound at 280 nm: The obtained curves for all identified compounds showed a good linearity (with an average of $r^2=0.99$): y=38,976x+4,1296 for syringic acid; y=32,266x+17,439 for p-coumaric acid;
Y=6,7915x-35,235 for myricitrin; y=9,5824x-7,4659 for quercetin and y=23,691x-88,898 for naringenin. The amount of each compound was expressed as milligram per gram of residue.

The results obtained for an extract (Extract) and for two fractions (Fraction A and Fraction B) obtained from this extract are present in Table 1.

TABLE 1

Phenolic compounds identified and quantified in *Cynara cardunculus* plant extract and in two fractions obtained from this extract

| Identified phenolic compounds | Retention time (min) | Molecular formula | Concentrations in mg/g of dry residue | | |
|---|---|---|---|---|---|
| | | | Extract | Fraction A | Fraction B |
| Syringic acid | 17.8 | $C_9H_{10}O_5$ | 0.108 | NI* | 1.308 |
| Myricitrin | 20.7 | $C_{21}H_{20}O_{12}$ | 0.755 | 3.088 | 64.764 |
| p-coumaric acid | 20.09 | $C_9H_8O_3$ | 0.487 | NI* | 0.576 |
| Quercetin | 23.7 | $C_{15}H_{10}O_7$ | 0.383 | 17.427 | 1.430 |
| Naringenin | 24.3 | $C_{15}H_{12}O_5$ | 0.359 | 4.486 | NI* |

*NI means that the concerned phenolic compound is not identified

Pre-Emergence Activity of a Composition According to the Invention
Experiment n° 1

Seeds of *Trifolium incarnatum* were obtained from ECOSEM industry (Belgium). Filter paper were moistened with (a) 2 ml of Tween 20® 1% solution (negative control), (b) 2 ml of a solution comprising *Cynara cardunculus* methanolic extract in Tween 20® 1% solution, (c) 2 ml of a solution comprising Fraction A in Tween 20® 1% solution and (d) 2 ml of a solution comprising Fraction B in Tween 20® 1% solution.

Methanolic extract of *Cynara cardunculus* and its two fractions (Fraction A and Fraction B) obtained by fractionation were tested on germination and seedling growth of *Trifolium incarnatum* at a concentration of 6 g/L. Such a concentration corresponds to a 4.53 mg/L myricitrin concentration for the extract, an 18.52 mg/L myricitrin concentration for the Fraction A and to a 388.58 mg/L myricitrin concentration for the Fraction B.

12 petri dishes were prepared and randomly placed in a growth chamber at a constant temperature of 23° C., in darkness, for 5 days. The number of germinated seedlings was counted after these 5 days, and their root and hypocotyl lengths were measured.

Figure 1:
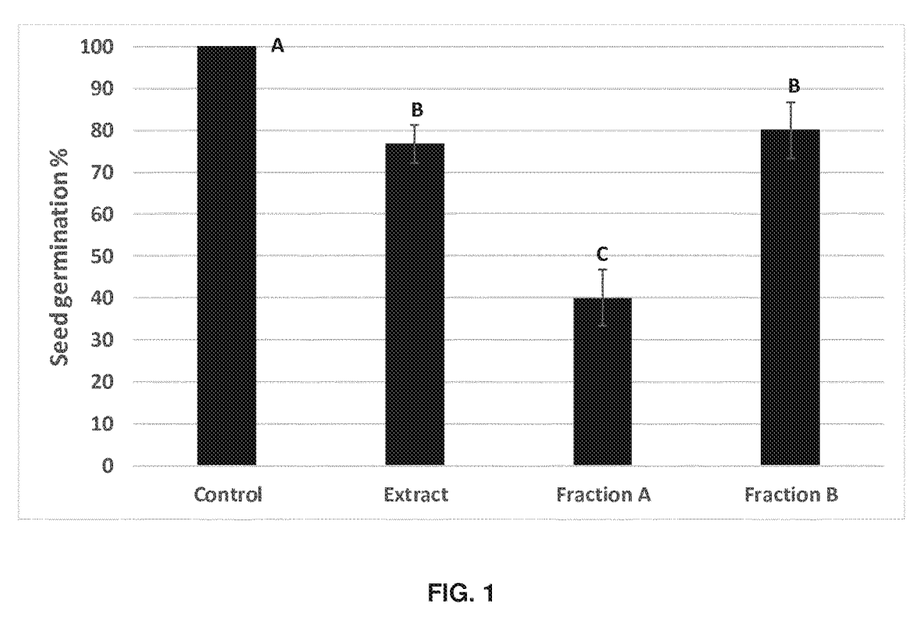
FIG. 1 shows the percentage of germination (seed germination %) after 5 days of the weed *Trifolium incarnatum* treated by a *Cynara cardunculus* plant extract (Extract), a first fraction obtained from the *Cynara cardunculus* plant extract (Fraction A) and by a second fraction obtained from the *Cynara cardunculus* plant extract (Fraction B)
Figure 2:
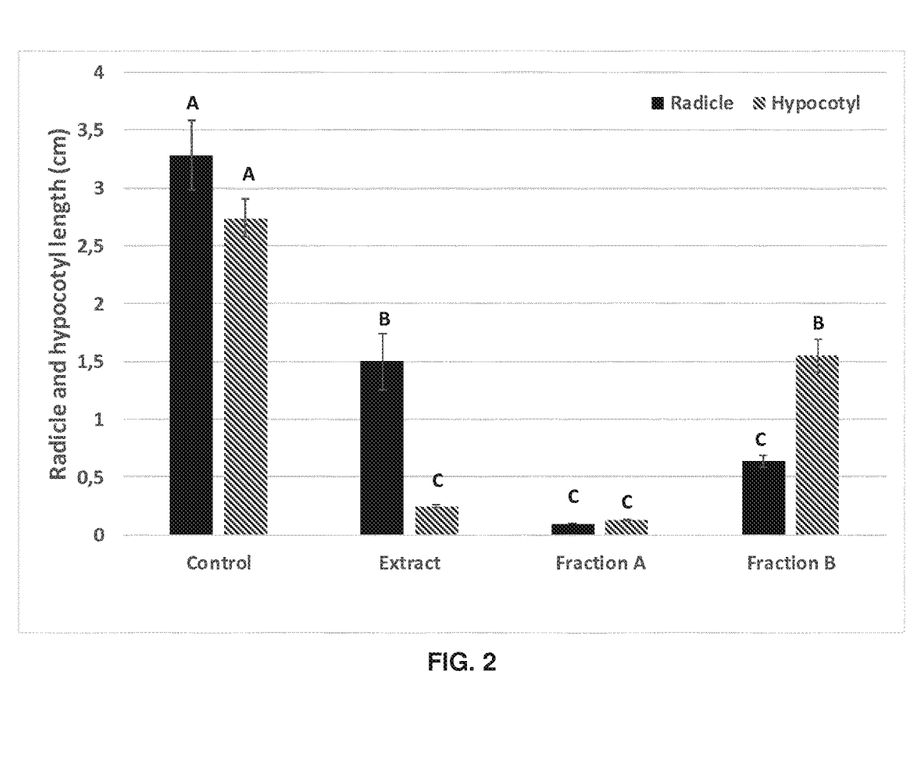
FIG. 2 shows the radicle and hypocotyl length (cm) after 5 days of the weed *Trifolium incarnatum* treated by a *Cynara cardunculus* plant extract (Extract), a first fraction obtained from the *Cynara cardunculus* plant extract (Fraction A) and by a second fraction obtained from the *Cynara cardunculus* plant extract (Fraction B)

The obtained results are presented in FIGS. 1 and 2. As it can be seen, the Fraction A was revealed more phytotoxic than the Fraction B and than the plant extract. In fact, Fraction A inhibited seed germination until 60% after 5 days of incubation (FIG. 1). Moreover, this Fraction A completely inhibited the growth of the *Trifolium incarnatum* radicle and hypocotyl (FIG. 2). Results obtained with Fraction B are also interesting since the seed germination rate and the radicle and hypocotyl lengths were significantly different from the control (FIGS. 1 and 2). Results obtained with the *Cynara cardunculus* extract are also significantly different from the control.

In summary, all the compositions according to the invention comprising myricitrin (Extract, Fraction A and Fraction B) demonstrate a pre-emergence herbicidal activity after 5 days.

Experiment n° 2

Seeds of *Trifolium incarnatum* were obtained from ECOSEM industry (Belgium). Filter papers were placed in petri dishes and moistened with 2 ml of methanol 1% solution for the seedling control, or with myricitrin solution at 100 mg/L in methanol 1% for the treated seedling. Methanol was identified as a solvent not interfering with the pre-emergence of plants.

Ten seeds of *Trifolium incarnatum* were then placed immediately in each petri dish and three replicates were prepared. All petri dishes were randomly placed in a growth chamber at a temperature of 23±1° C., in the dark and the hypocotyls and root lengths were measured after 7 days.

Figure 5:
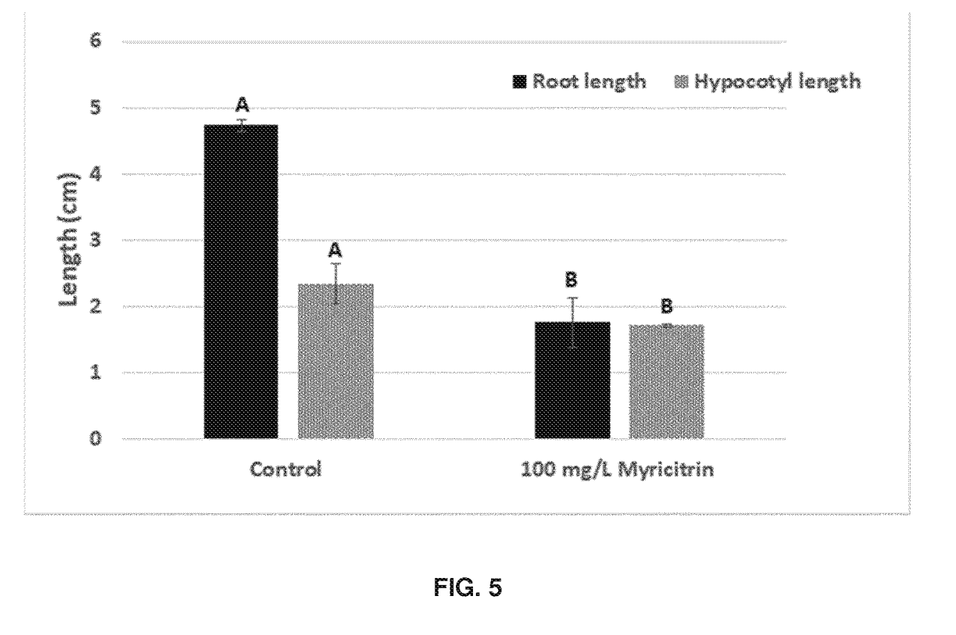
FIG. 5 shows the radicle and hypocotyl length (cm) after 7 days of the weed *Trifolium incarnatum* treated by a myricitrin solution at 100 mg/L in methanol 1%.

The obtained results are presented in FIG. 5. As it can be seen, at 100 mg/L, myricitrin showed a significant phytotoxic effect on the pre-emergence of *Trifolium incarnatum* in comparison with the control: myricitrin inhibited the development of roots and hypocotyls.

Also, it was noted that root inhibition for seeds treated by myricitrin was manifested by a development of the slight secondary roots which can be caused by an oxidative stress.

In summary, myricitrin demonstrated a pre-emergence herbicidal activity and inhibited seed germination of *Trifolium incarnatum* compared with control what is confirmed by a reduction of the root and hypocotyl lengths after 7 incubation days.

Post-Emergence Activity of Compositions According to the Invention

A first experiment was performed to study the post-emergence activity of different compositions according to the invention. This first experiment was performed on 2-3 weeks old *Trifolium incanatum* plants under greenhouse semi-controlled conditions (natural photoperiod supplemented with artificial light if needed with 23±2° C. according to the sunlight) and the following compositions according to the invention were tested: (a) formulated *Cynara cardunculus* plant extract at 31 g/L (corresponding to a 23.4 mg/L myricitrin concentration), (b) *Cynara cardunculus* plant extract at 31 g/L (corresponding to a 23.4 mg/L myricitrin concentration) in Tween 20® 1% solution, (c) formulated Fraction A of *Cynara cardunculus* plant extract at 20 g/L (corresponding to a 61.7 mg/L myricitrin concentration), (d) Fraction A of *Cynara cardunculus* plant extract at 20 g/L (corresponding to a 61.7 mg/L myricitrin concentration) in Tween 20® 1% solution and (e) formulated myricitrin at 60 mg/L.

When formulated, *Cynara cardunculus* plant extract, Fraction A or myricitrin were mixed with the following compounds as mentioned in Table 2.

TABLE 2 formulations of compositions according to the invention

|  | Extract % | Fraction A % | Myricitrin % |
|---|---|---|---|
| Plant extract | 3.1 | | |
| Fraction | | 2 | |
| Myricitrin | | | 0.006 |
| Vegetable oil of hazelnut | 3.1 | 3.1 | 3.1 |
| Span 80 ® | 1.6 | 1.6 | 1.6 |
| Tween 20 ® | 0.4 | 0.4 | 0.4 |
| Atplus ® UEP-100 | 0.25 | 0.25 | 0.25 |
| Ethanol | 0.5 | 0.5 | 0.5 |
| Water | 91.05 | 92.15 | 94.14 |
| Total | 100 | 100 | 100 |

Seeds of *Trifolium incanatum* were sown in pots and the obtained plants were watered daily. When the plants had two leaf stages, these were sprayed with pelargonic acid (positive control used as commercial bioherbicide at 31 g/L), with distilled water (negative control), with the compounds of the formulation only (see Table 2) or with one of the compositions (a) to (d) according to the invention and described above. There were eight treatments and three replicates per treatment maintained in a completely randomised manner. Five days after spraying, the treated weed plants were examined for visible injury levels in terms of wilting, necrosis and chlorosis. A percentage of efficacy was determined as followed: (number of wilted or necrotic leaves/total number of leaves)*100.

Figure 3:
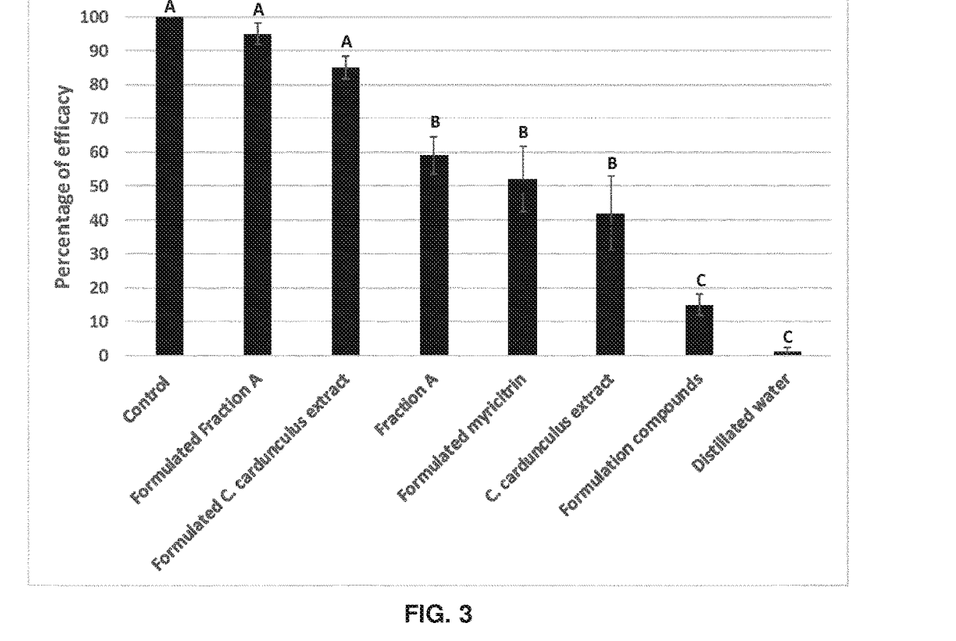
FIG. 3 shows the post-emergence activity (percentage of efficacy) of different compositions according to the invention on the treated weed *Trifolium incarnatum* after 5 days: formulated *Cynara cardunculus* plant extract, *Cynara cardunculus* plant extract, formulated Fraction A of *Cynara cardunculus* plant extract, Fraction A of *Cynara cardunculus* plant extract and formulated myricitrin.

The obtained results are presented in FIG. 3. As it can be seen, all the compositions according to the invention present a post-emergence herbicidal activity. Plant extract of *Cynara cardunculus* and the obtained Fraction A from this extract presented a higher herbicidal activity when formulated compared to their efficacy without formulation. Formulated Fraction A at 20 g/L presented the same effect shown by pelargonic acid at 31 g/L. Formulated myricitrin tested at the same concentration than the one found in the Fraction A appeared also phytotoxic with 52.33% of efficacity.

A second experiment was performed to study the post-emergence activity of different compositions according to the invention on another plant, i.e. *Arabidopsis thaliana*. This second experiment was performed on 2-3 weeks old *Arabidopsis thaliana* plants under greenhouse semi-controlled conditions (continuous light; 23±2° C.) and the following compositions according to the invention were tested: (a) formulated *Cynara cardunculus* plant extract at 31 g/L (corresponding to a 23.4 mg/L myricitrin concentration) and (e) formulated myricitrin at 60 mg/L.

When formulated, *Cynara cardunculus* plant extract and myricitrin were mixed with the compounds as mentioned in the above Table.

Seeds of *Arabidopsis thaliana* were sown in pots and the obtained plants were watered daily. When the plants had two leaf stages, these were sprayed with pelargonic acid (positive control used as commercial bioherbicide at 31 g/L), with distilled water (negative control), with the compounds of the formulation only (see Table 2) or with one of the compositions (a) and (e) according to the invention and described above. There were five treatments and three replicates per treatment maintained in a completely randomised manner. Four days after spraying, the treated weed plants were examined for visible injury levels in terms of wilting, necrosis and chlorosis. A percentage of efficacy was determined as followed: (number of wilted or necrotic leaves/total number of leaves)*100.

Figure 4:
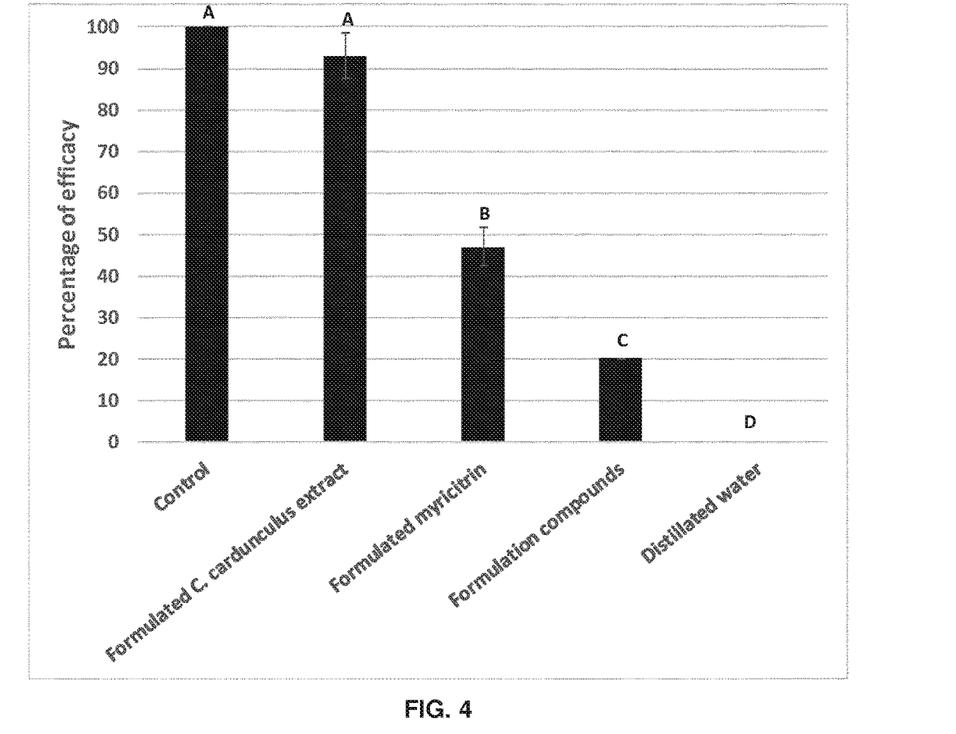
FIG. 4 shows the post-emergence activity (percentage of efficacy) of different compositions according to the invention on the treated weed *Arabidopsis thaliana* after 4 days: formulated *Cynara cardunculus* plant extract and formulated myricitrin.

The obtained results are presented in FIG. 4. As it can be seen, all the compositions according to the invention present a post-emergence herbicidal activity. From the results shown in FIG. 4, formulated *Cynara cardunculus* plant extract showed a high herbicidal effect, like the herbicidal effect of pelargonic acid at 31 g/L. At 60 mg/L, the formulated myricitrin also presents a phytotoxic effect on *Arabidopsis thaliana*.

Statistical Analysis

All statistical analyses were performed with Minitab 17 Statistical Software (Minitab Inc., State College, Pa., USA). Results were examined statistically using one-way analysis of variance (ANOVA) followed by Tukey multiple range tests, with different concentration of methanolic plant extracts. All determinations were conducted in triplicate. The differences between individual means were considered significant if $p<0.05$.

The present invention has been described in terms of specific embodiments, which are illustrative of the invention and not to be construed as limiting. More generally, it will be appreciated by persons skilled in the art that the present invention is not limited by what has been particularly shown and/or described hereinabove.

Reference numerals in the claims do not limit their protective scope.

Use of the verbs "to comprise", "to include", "to be composed of", or any other variant, as well as their respective conjugations, does not exclude the presence of elements other than those stated.

Use of the article "a", "an" or "the" preceding an element does not exclude the presence of a plurality of such elements.

The invention claimed is:

1. A method comprising:
   applying an herbicidal composition including myricitrin to at least one of a part of a plant, a seed, or soil; and
   obtaining phytotoxic activity including at least one of:
   (a) inhibiting or preventing seed germination, or
   (b) inhibiting or preventing at least one of:
      (1) development and growth of roots,
      (2) development and growth of hypocotyls,
      (3) development and growth of epicotyls,
      (4) development and growth of plantlets, or
      (5) development and growth of aerial parts of the plant.

2. The method of claim 1, wherein the myricitrin is: from synthetic origin; or
   from an extract or a fraction of an extract from at least one of roots, leaves, stems, fruits, seeds or flowers of at least one plant chosen from the group consisting of *Limoniastrum guyonianum*, *Peganum harmala*, *Ruta chalepensis*, *Ricinus communis*, *Nitraria retusa*, *Cynara cardunculus*, *Artemisia herba-alba*, *Mesembryanthemum edule*, *Tamarix gallica*, *Datura stramonium*, *Myrica esculenta*, *Myrica cerifera*, *Nymphaea lotus*, *Nymphaea odorata*, *Chrysobalanus icaco*, *Polygonum aviculare* and mixtures thereof.

3. The method of claim 1, wherein the myricitrin is present in the herbicidal composition at a concentration ranging from 0.1 mg/L to 10000 mg/L.

4. The method of claim 1, wherein the herbicidal composition includes at least one additional active compound chosen from the group consisting of syringic acid, p-coumaric acid, quercetin, naringenin, catechin, apigenin, gallic acid, cynarin acid, chlorogenic acid, cynaroside, luteolin, aguerin B, grosheimin, cynaropicrin and mixtures thereof.

5. The method of claim 4, wherein the at least one additional active compound is:
from synthetic origin; or
from an extract or a fraction of an extract from at least one of roots, leaves, stems, fruits, seeds or flowers of at least one plant chosen from the group consisting of *Limoniastrum guyonianum, Peganum harmala, Ruta chalepensis, Ricinus communis, Nitraria retusa, Cynara cardunculus, Artemisia herba-alba, Mesembryanthemum edule, Tamarix gallica, Datura stramonium, Myrica esculenta, Myrica cerifera, Nymphaea lotus, Nymphaea odorata, Chrysobalanus icaco, Polygonum aviculare* and mixtures thereof.

6. The method of claim 4, wherein the at least one additional active compound is present in the herbicidal composition at a concentration ranging from 0.1 mg/L to 10000 mg/L.

7. The method of claim 1, wherein the herbicidal composition includes at least one solvent chosen from the group consisting of at least one natural lipophilic solvent, at least one synthetic lipophilic solvent, at least one natural hydrophilic solvent, at least one synthetic hydrophilic solvent, at least one natural amphiphilic solvent, at least one synthetic amphiphilic solvent and mixtures thereof.

8. The method of claim 7, wherein the lipophilic solvent is chosen from the group consisting of animal oil, vegetable oil, petrochemical oil and mixtures thereof.

9. The method of claim 8, wherein the vegetable oil is chosen from the group consisting of hazelnut oil, rapeseed oil, pine oil, soybean oil, sunflower oil, pistachio oil, olive oil, almond oil, sweet almond oil, peanut oil and mixtures thereof.

10. The method of claim 7, wherein the hydrophilic solvent is chosen from the group consisting of water, alcohols, ketones, esters, ethers, polyols, ethyl acetate, propylene carbonate, acetonitrile and mixtures thereof.

11. The method of claim 7, wherein at least one of the natural amphiphilic solvent or the synthetic amphiphilic solvent is at least one non-ionic surfactant.

12. The method of claim 11, wherein the non-ionic surfactant is chosen from the group consisting of sorbitan monododecanoate poly(oxy-1,2-ethanediyl), alkyl polyglucosides, sorbitan laurate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene glycol sorbitan laurate, hexaethylene glycol sorbitan monooleate, polyoxyethylene sorbitan stearate, decaglyceryl monooleate, decaglyceryl dioleate, polyoxyethylene sorbitan tristearate, monodehydrosorbitol monooleate, sorbitan monolaurate, sorbitan monopalmitate, sorbitan laurate and mixtures thereof.

13. The method of claim 11, wherein the non-ionic surfactant presents a hydrophilic-lipophilic balance (HLB) value between 5 and 7.

14. The method of claim 11, wherein the non-ionic surfactant is present in the composition at a concentration ranging from 0.1 g/L to 500 g/L.

15. The method of claim 1, wherein the herbicidal composition includes at least one of paraffin wax, 1-octyl-2-pyrrolidone, or and mixtures thereof.

16. The method of claim 1, wherein the herbicidal composition is in the form of granules, liquids, emulsions or concentrates.

17. The method of claim 1, wherein the myricitrin is present in the herbicidal composition at a concentration ranging from 1 mg/L to 100 mg/L.

18. The method of claim 4, wherein the at least one additional active compound is present in the composition at a concentration ranging from 0.25 mg/L to 500 mg/L.

19. The method of claim 11, wherein the non-ionic surfactant presents a hydrophilic-lipophilic balance (HLB) value equal to 6.

20. The method of claim 11, wherein the non-ionic surfactant is present in the composition at a concentration ranging from 2 g/L to 25 g/L.

* * * * *

UNITED STATES PATENT AND TRADEMARK OFFICE
CERTIFICATE OF CORRECTION

PATENT NO. : 11,229,204 B2
APPLICATION NO. : 16/971746
DATED : January 25, 2022
INVENTOR(S) : Ben Kaab et al.

It is certified that error appears in the above-identified patent and that said Letters Patent is hereby corrected as shown below:

In the Claims

Column 14, Line 24 Claim 15: after "pyrrolidone, or" delete "and"

Signed and Sealed this
Seventh Day of June, 2022

Katherine Kelly Vidal
*Director of the United States Patent and Trademark Office*